United States Patent [19]

Connors, Sr. et al.

[11] Patent Number: 5,418,198
[45] Date of Patent: May 23, 1995

[54] PELLETIZABLE GUNNING COMPOSITION

[75] Inventors: Charles W. Connors, Sr., Wilmette; Subrata Banerjee, Wheaton, both of Ill.

[73] Assignee: Magneco/Metrel, Inc., Addison, Ill.

[21] Appl. No.: 110,379

[22] Filed: Aug. 23, 1993

[51] Int. Cl.⁶ .............................................. C04B 35/04
[52] U.S. Cl. ........................... 501/109; 501/108; 264/30; 264/117; 23/313 R; 427/577
[58] Field of Search ............... 501/100, 101, 108, 109, 501/141; 264/30, 297.9, 176.1, 141, 117; 23/313 R, 313 P; 427/577, 427

[56] References Cited

U.S. PATENT DOCUMENTS

| | | | |
|---|---|---|---|
| 2,741,822 | 4/1956 | Udy | 501/108 |
| 3,041,205 | 6/1962 | Iler | 117/129 |
| 3,067,050 | 12/1962 | Miller, Jr. | 106/65 |
| 3,353,975 | 11/1967 | Shannon et al. | 106/65 |
| 3,432,312 | 3/1969 | Feagin et al. | 106/38.3 |
| 3,652,307 | 3/1972 | Bakker | 106/65 |
| 3,842,760 | 10/1974 | Parsons et al. | 106/56 |
| 3,892,584 | 7/1975 | Takeda et al. | 106/56 |
| 3,920,578 | 11/1975 | Yates | 252/313 S |
| 4,018,615 | 4/1977 | Mills | 106/69 |
| 4,041,199 | 8/1977 | Cartwright | 428/36 |
| 4,056,399 | 11/1977 | Kirkpatrick et al. | 106/69 |
| 4,061,501 | 12/1977 | Ivarsson et al. | 106/44 |
| 4,069,057 | 1/1978 | Kamei et al. | 106/55 |
| 4,128,431 | 12/1978 | Svec | 106/38.35 |
| 4,139,393 | 2/1979 | Chandhok | 106/38.3 |
| 4,222,782 | 9/1980 | Alliegro et al. | 106/57 |
| 4,226,625 | 10/1980 | Delcorio et al. | 106/38.22 |
| 4,331,773 | 5/1982 | Hongo et al. | 501/128 |
| 4,342,597 | 8/1982 | Brown | 106/38.27 |
| 4,427,800 | 1/1984 | Nakamura et al. | 523/145 |
| 4,476,234 | 10/1984 | Jones et al. | 501/89 |
| 4,751,204 | 6/1988 | Kyoden et al. | 501/89 |
| 4,780,142 | 10/1988 | Rechter | 106/84 |
| 4,800,181 | 1/1989 | Lassiter et al. | 501/89 |
| 4,916,092 | 4/1990 | Tiegs et al. | 501/89 |
| 5,147,834 | 9/1992 | Banerjee | 501/129 |
| 5,240,498 | 8/1993 | Matalon et al. | 106/162 |
| 5,284,808 | 2/1994 | Damiano et al. | 501/103 |

FOREIGN PATENT DOCUMENTS

| | | | |
|---|---|---|---|
| 0535233 | 4/1993 | European Pat. Off. | C04B 35/66 |
| 051262 | 3/1973 | Japan | 501/128 |
| 065558 | 4/1973 | Japan | 501/128 |
| 222731 | 10/1984 | Japan | C04B 35/10 |
| 277985 | 7/1986 | Japan | C04B 35/66 |

*Primary Examiner*—Mark L. Bell
*Assistant Examiner*—Paul Marcantoni
*Attorney, Agent, or Firm*—Maxwell J. Petersen; Willian Brinks Hofer Gilson & Lione

[57] ABSTRACT

A pelletizable gunning composition is provided which exhibits excellent flow characteristics, minimal release of dust, and excellent adhesion and resistance to slag. The gunning composition includes high density magnesium oxide as the primary component, and lesser quantities of powdered metal, refractory clay, binder and, preferably, graphite. The dry components are mixed together, and the binder is added and mixed, resulting in a composition that can be pelletized. After pelletizing, the composition can be coated with a dusting material to facilitate pellet flow and prevent pellet agglomeration.

27 Claims, No Drawings

PELLETIZABLE GUNNING COMPOSITION

FIELD OF THE INVENTION

The present invention is a pelletizable gunning composition having improved flow.

BACKGROUND OF THE INVENTION

Various gunning compositions are known and used in the iron and steel industry for repairing and maintaining steel ladles, troughs, runners, spouts, electric furnaces, basic oxygen furnaces, and other equipment for containing and/or processing molten metal. Typically, these known gunning compositions are in a powdered form and include a major portion of a refractory base material (for example, calcined clay, mullite, brown fused alumina, tabular alumina); a minor portion of silicon carbide or graphite; further minor portions of ball clay, silicon carbide or graphite, and silicon metal; and a binder which advantageously includes colloidal silica. Examples of gunning compositions are provided in U.S. Pat. No. 5,147,834, issued to Banerjee.

An important aspect of a gunning composition is the ability to flow in the gunning process. In order to facilitate easy and uniform flow, conventional powdered gunning compositions have been mixed with water and sold in the form of damp mixtures. It is even more advantageous to pelletize the gunning compositions, when possible, into pellets having diameters of about 1–60 millimeters. However, it has been difficult to pelletize conventional gunning mixes due to their somewhat "sandy" or "pasty" nature prior to application.

An equally important aspect of a gunning composition is its ability to stick to an applied refractory surface, both during and after application. Therefore, when formulating the gunning compositions of the prior art, a significant challenge has been to develop compositions which would flow (and not self-agglomerate) prior to application, yet which would stick to applied surfaces, and resist erosion and corrosion, when exposed to molten iron or steel.

SUMMARY OF THE INVENTION

The present invention is directed to a gunning composition which can readily and easily be pelletized prior to use. By pelletizing the gunning composition, a more uniform flow is achieved, resulting in more homogeneous feed to the gunning process and application to the refractory surfaces. Also, both the gunning composition and the gunning process are relatively dust-free, because the amount of powder in the composition is substantially reduced.

The pelletizable gunning composition of the invention includes, as the primary component, high density magnesium oxide (MgO). The gunning composition also includes minor portions of metallic powder, ball clay and binder. Preferably, the gunning composition includes an additional minor portion of graphite and the binder includes phenol formaldehyde.

To prepare the pelletizable gunning composition, the high density magnesium, metallic powder, refractory clay and, preferably, graphite, are blended together without the binder, preferably using a high speed mixer. Then, the binder is added, and the blend is mixed further. The resulting blend is pelletized using standard pelletizing equipment. The pellets are then dusted with a small quantity of a dusting material, such as flake graphite or carbon black powder. Finally, the pellets are dried.

With the foregoing in mind, it is a feature and advantage of the invention to provide a gunning composition which can be fed to a conventional gunning apparatus in the form of free flowing pellets.

It is also a feature and advantage of the invention to provide a gunning composition which can be applied more uniformly and homogeneously than conventional powdered gunning compositions.

It is also a feature and advantage of the invention to provide a gunning composition which flows freely during application, yet exhibits excellent adhesion to applied refractory surfaces and excellent resistance to subsequent corrosion and erosion.

It is also a feature and advantage of the invention to provide a gunning composition which exhibits a much lower release of dust prior to and during application, than conventional powdered gunning compositions.

The foregoing and other features and advantages of the invention will become further apparent from the following detailed description of the presently preferred embodiments, read in conjunction with the accompanying examples. The detailed description and examples are merely illustrative rather than limiting, the scope of the invention being defined by the appended claims and equivalents thereof.

DETAILED DESCRIPTION OF THE PRESENTLY PREFERRED EMBODIMENTS

In accordance with the invention, a pelletizable gunning composition includes the following optimum ingredients and quantities thereof, in order to provide good pelletizability, excellent pellet flow, optimum adhesion to applied refractory surfaces and excellent resistance to corrosion and erosion caused by prolonged and/or frequent exposure to molten metal.

The primary component of the pelletizable gunning composition is high density magnesia. The magnesia should have a density of at least about 3.0 grams per cubic centimeter, preferably at least about 3.2 grams per cubic centimeter, and most preferably about 3.4–3.5 grams per cubic centimeter. The high density magnesia constitutes about 55–90% by weight of the gunning composition, preferably about 65–85% by weight of the gunning composition, most preferably about 75–85% by weight of the gunning composition.

In order to achieve the optimum compaction of the magnesium oxide, resulting in the desired high density, the magnesia should include about 50–80% by weight (of the magnesia) of particles having diameters between about 300 microns and about 5 millimeters. The magnesia should also include about 10–30% by weight of fused magnesia particles having particle diameters of about 5–300 microns, and fused crystal diameters of about 200–1000 microns. The balance of the magnesia can include any conventional magnesia particles.

The gunning composition preferably includes about 1–15% by weight graphite, more preferably about 1–10% by weight graphite, most preferably about 2–8% by weight graphite. The graphite may be in the form of flakes, crystals, carbon black powder, or any form which includes at least about 90% by weight carbon. The graphite flakes or particles should have an average diameter of about 50–300 microns. Most preferably, the graphite is in the form of flakes.

The gunning composition of the invention includes about 1–12% by weight metallic powder, preferably about 2-8% by weight metallic powder, most preferably about 3-6% by weight powdered metal. The metallic powder preferably has an average particle diameter of about 5-500 microns. The preferred metallic powders are elemental aluminum powder, silicon powder, magnesium powder, magnesium-aluminum alloy, or a combination of these. The most preferred metallic powder is aluminum metal powder.

The gunning composition of the invention includes about 1-10% by weight refractory clay, preferably about 1-8% by weight refractory clay, most preferably about 2-6% by weight refractory clay. The preferred refractory clay is ball clay, which includes about 28-30% by weight alumina, about 66-70% by weight silica, and a balance substantially of sodium oxide and titania. The ball clay preferably has an average particle diameter of about 0.1-20 microns.

The gunning composition of the invention includes about 4-25% by weight of a binder, preferably about 7-20% by weight of a binder, most preferably about 8-15% by weight of a binder. The preferred binder includes phenol formaldehyde and a solvent, preferably water. The binder preferably includes about 70-90% by weight phenol formaldehyde and 10-30% by weight water, most preferably about 75-85% by weight phenol formaldehyde and about 15-25% by weight water. The preferred binder can be prepared by combining one part by weight phenol formaldehyde powder resin with about 2-3 parts by weight of a commercially available liquid phenol formaldehyde (which typically contains 67-75% by weight phenol formaldehyde and 25-33% by weight water).

In addition to their combined features of pelletizability, good flow, and excellent product performance (mentioned above), each component of the gunning composition makes an individual contribution to the invention. The high density magnesium oxide provides high temperature resistance to slag and, in particular, to basic oxygen furnace slag. The graphite causes the gunning composition to be nonwettable or less wettable to slag, and to have better penetration resistance and corrosion resistance to slag.

The refractory clay contributes plasticity and cohesiveness to the gunning composition. The powdered metal provides improved oxidation resistance to the composition by serving as an oxygen scavenger. Elemental aluminum, for example, prevents oxidation of the graphite by preferentially reacting with oxygen which might otherwise react with the graphite. In the process, the elemental aluminum can be converted into a high refractory oxide, such as $Al_2O_3$, which is quite suitable for inclusion in the gunning composition. In a similar fashion, elemental magnesium will react with oxygen to form high refractory magnesia, and elemental silicon will react to form high refractory silica, while protecting the remaining components from oxidation.

The binder provides cohesiveness to the pellets and to the gunning composition during pelletizing. The binder also causes the gunning composition to have excellent adhesion to the applied refractory surfaces.

The gunning composition of the invention can be prepared by first dry mixing the high density magnesia, metallic powder, refractory clay and, preferably, graphite together, without the binder, in a high speed mixer. A particularly suitable high speed mixer is a Lancaster batch mixer available from Kercher Industries located in Lebanon, Pa. Suitable mixing conditions for this step include a mixing rpm of 800-1200, and a mixing time of 2-3 minutes.

Next, the binder is added to the mixer and the components are blended for an additional time of 1-2 minutes, to form a gunning composition. One way of pelletizing the gunning composition is to agglomerate the granular composition into pellets. Agglomeration into pellets can be accomplished by mixing the gunning composition in a ribbon blender or other suitable mixer, with about 0.25-4.0% by weight mineral oil. The mineral oil can be a light oil or a heavy oil, but must have sufficient viscosity and intermolecular tension to cause the gunning composition to "ball up" into ball-shaped pellets.

A particularly suitable mineral oil is fuel oil. Preferably, the fuel oil is added at about 1.0-3.5% by weight of the gunning composition, most preferably at about 1.5-2.5% by weight of the gunning composition. Other suitable oils, in other suitable amounts, can also be used.

The gunning composition can also be pelletized using a pelletizer. A suitable pelletizer is a rotating disc (inclined pan) pelletizer available from Mars Mineral Corp. in Valencia, Pa. Suitable pelletizing conditions include a pelletizer rpm of 70-90, and an angle of 60-80 degrees.

The gunning composition can be fed to the ribbon blender or pelletizer using a bucket elevator or a conveyor from the mixer. Each of the pellets has a diameter of about 0.5-10 millimeters, preferably about 1-5 millimeters.

The pellets can be covered with a dusting material, for example, carbon black or flake graphite, to prevent agglomeration between different pellets. The preferred dusting material is flake graphite, used in an amount of about 0.05-2.5% by weight of the gunning composition, preferably about 0.5-1.0% by weight of the gunning composition. Flake graphite is more cohesive than most dusting materials, and causes less release of dust into the surrounding atmosphere. The flake graphite can be added by tumble blending the flake graphite with the pelletized gunning composition, or by another suitable process.

Pellets formed with a pelletizer can then be dried. A suitable drier is a low temperature rotating drier, set at a temperature of about 100°-150° F., for a time period of about 1-5 minutes. The final product is now ready for use with any conventional gunning apparatus.

A wide range of changes and modifications to the invention described above will be apparent to persons skilled in the art. The following Examples are not to be construed as imposing limitations on the invention, but are included merely to illustrate preferred embodiments.

EXAMPLE I

A gunning composition was prepared by mixing the following components together in the stated quantities:

| Component | Particle Size | Parts By Weight |
| --- | --- | --- |
| MgO (density of 3.40 g/cc) | 0.1-5 mm | 70 |
| MgO (density of 3.50 g/cc) | <200 microns | 20 |
| Flake graphite | 50-200 microns | 3 |
| Aluminum powder | 40-200 microns | 4 |
| Ball clay | 0.5-10 microns | 3 |
| Phenol formaldehyde | 80-150 microns | 2 |

| Component | Particle Size | Parts By Weight |
|---|---|---|
| resin | | |
| Liquid phenol formaldehyde (25% H₂O) | | 8 |

All of the ingredients except the phenol formaldehyde components were dry mixed in a Lancaster batch mixer using an rpm of 1000 and a mixing time of 3–4 minutes. Then, the binder ingredients were added to the mixture and blended for an additional time of 1–2 minutes. The resulting gunning composition was cut into pellets having diameters of about 0.1–5 millimeters using an inclined pan pelletizer. The pellets were tumble blended with 1.0% by weight additional flake graphite, and the coated pellets were dried.

The final gunning product flowed freely and uniformly during gunning, released very little dust, and gave excellent adhesion, strength, resistance to cracking, and resistance to oxidation, corrosion and erosion.

EXAMPLE II

A gunning composition can be prepared by mixing the following components together in the stated quantities:

| Component | Particle Size | Parts By Weight |
|---|---|---|
| MgO (density of 3.40 g/cc) | 0.1–5 mm | 65 |
| MgO (density of 3.50 g/cc) | <200 microns | 25 |
| Flake graphite | 50–200 microns | 2 |
| Silicon powder | 40–200 microns | 5 |
| Ball clay | 0.5–10 microns | 2 |
| Phenol formaldehyde resin | 80–150 microns | 4 |
| Liquid phenol formaldehyde (25% H₂O) | | 6 |

All of the ingredients except the binder can be dry mixed in a Lancaster batch mixer using an rpm of 1000 and a mixing time of 3–5 minutes. Then, the binder ingredients can be added to the mixture and blended for an additional time of 1–2 minutes. The resulting gunning composition can be cut into pellets having diameters of about 0.5–5 mm using an inclined pan pelletizer. The pellets are tumble blended with 0.5% by weight flake graphite, and the coated pellets are dried.

The final gunning product flows freely and uniformly during gunning, releases very little dust, and gives excellent adhesion, strength, resistance to cracking, and resistance to oxidation, corrosion and erosion.

While the embodiments disclosed herein are presently considered preferred, various modifications and improvements can be made without departing from the spirit and scope of the invention. The scope of the invention is indicated in the appended claims, and all changes that fall within the meaning and range of equivalence are intended to be embraced therein.

We claim:

1. A method of preparing a pelletized gunning composition, comprising the steps of:
   forming a dry mixture including about 55–90% by weight high density magnesium oxide, about 1–12% by weight metallic powder, and about 1–10% by weight refractory clay based on the total weight of the gunning composition;
   adding about 4–25% by weight binder to the dry mixture, and blending the components together to form the gunning composition; and
   forming the gunning composition into pellets.

2. The method of claim 1, wherein the dry mixture further includes about 1–15% by weight graphite based on the total weight of the gunning composition.

3. The method of claim 1, further comprising the step of coating the pellets with a dusting material.

4. The method of claim 1, further comprising the step of drying the coated pellets.

5. The method of claim 1, wherein the binder comprises phenol formaldehyde and water.

6. The method of claim 3, wherein the dusting material comprises graphite.

7. The method of claim 1, wherein the metallic powder comprises a metal selected from the group consisting of aluminum, magnesium, silicon, magnesium-aluminum alloy, and combinations thereof.

8. The method of claim 1, wherein the metallic powder comprises aluminum.

9. The method of claim 1, wherein the refractory clay comprises ball clay.

10. The method of claim 1, wherein the dry mixture is formed using a high speed mixer.

11. The method of claim 1, wherein the pellets have diameters of about 0.5–10 millimeters.

12. The method of claim 1, wherein the pellets have diameters of about 1–5 millimeters.

13. The method of claim 1, wherein the magnesium oxide has a density of at least about 3.0 grams per cubic centimeter.

14. The method of claim 1, wherein the magnesium oxide has a density of at least about 3.2 grams per cubic centimeter.

15. The method of claim 1, wherein the magnesium oxide has a density of about 3.4–3.5 grams per cubic centimeter.

16. The method of claim 1, wherein the high density magnesium oxide is provided at about 65–85% by weight of the gunning composition.

17. The method of claim 1, wherein the high density magnesium oxide is provided at about 75–85% by weight of the gunning composition.

18. The method of claim 1, wherein the metallic powder is provided at about 2–8% by weight of the gunning composition.

19. The method of claim 1, wherein the metallic powder is provided at about 3–6% by weight of the gunning composition.

20. The method of claim 1, wherein the refractory clay comprises ball clay.

21. The method of claim 1, wherein the refractory clay is provided at about 1–8% by weight of the gunning composition.

22. The method of claim 1, wherein the binder is added at about 7–20% by weight of the gunning composition.

23. The method of claim 2, wherein the graphite is provided at about 1–10% by weight of the gunning composition.

24. A method of preparing a pelletized gunning composition, comprising the steps of:
   forming a dry mixture including about 55–90% by weight high density magnesium oxide, about 1–12% by weight metallic powder, and about 1-10% by weight refractory clay, based on the total weight of the gunning composition;

adding about 4-25% by weight binder to the dry mixture, and blending the components together to form the gunning composition;

forming the gunning composition into pellets; and coating the pellets with about 0.5-2.5% by weight of a dusting material.

25. The method of claim 24, wherein the dusting material comprises carbon black.

26. The method of claim 24, wherein the dusting material comprises graphite flakes.

27. The method of claim 24, wherein the dusting material is provided at about 0.5-1.0% by weight.

* * * * *